(12) United States Patent
Erickson et al.

(10) Patent No.: US 11,734,236 B1
(45) Date of Patent: Aug. 22, 2023

(54) MANAGING RELATIONAL DATABASES

(71) Applicant: Wells Fargo Bank, N.A., San Francisco, CA (US)

(72) Inventors: Jeffrey Allen Erickson, Farmersville, TX (US); Marjorie Ann Bue, Clear Lake, MN (US); Richard Forrest Herwig, Jr., Burnsville, MN (US); Michael Shaun Ogilvie, Little Canada, MN (US); George Reynard Davis, Jr., Charlotte, NC (US); Denise May Broderick, Zimmerman, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 453 days.

(21) Appl. No.: 16/901,533

(22) Filed: Jun. 15, 2020

(51) Int. Cl.
*G06F 16/00* (2019.01)
*G06F 16/21* (2019.01)
*G06F 16/23* (2019.01)
*G06F 16/22* (2019.01)

(52) U.S. Cl.
CPC .......... *G06F 16/214* (2019.01); *G06F 16/212* (2019.01); *G06F 16/2282* (2019.01); *G06F 16/2379* (2019.01)

(58) Field of Classification Search
CPC .. G06F 16/213; G06F 16/219; G06F 11/3672; G06F 17/30371; Y10S 707/99931; Y10S 707/99933; Y10S 707/99934; Y10S 707/99953
See application file for complete search history.

(56) References Cited

U.S. PATENT DOCUMENTS

| | | | |
|---|---|---|---|
| 7,269,703 B2 * | 9/2007 | Watanabe | G06F 3/0607 709/214 |
| 8,010,909 B1 * | 8/2011 | Hanson | G06F 16/26 715/854 |
| 8,549,248 B2 * | 10/2013 | Liu | G06F 3/0619 711/161 |
| 9,280,569 B2 | 3/2016 | Do | |
| 9,430,505 B2 | 8/2016 | Rajan | |
| 9,519,663 B2 | 12/2016 | Engelko | |
| 9,747,311 B2 | 8/2017 | Buehne | |
| 9,779,126 B2 | 10/2017 | Tu | |
| 9,977,798 B2 | 5/2018 | Bester | |
| 9,996,562 B2 | 6/2018 | Higginson | |
| 10,268,633 B2 | 4/2019 | Mohanty | |
| 10,346,374 B1 | 7/2019 | Johnson | |

(Continued)

OTHER PUBLICATIONS

Ferreto et al., "Server Consolidation with Migration Control for Virtualized Data Centers," Future Generation Computer Systems 27 (2011), pp. 1027-1034, ScienceDirect. (Year: 2011).*

(Continued)

*Primary Examiner* — Cheryl Lewis
(74) *Attorney, Agent, or Firm* — Merchant & Gould P.C.

(57) ABSTRACT

A relational database for migrating data in a workflow between databases in different environments. Graphical user interfaces are generated through which database management scripts are automatically generated for migrating data between environments. Generally, the database management scripts are compatible with database attributes. The database management scripts are executed to update data tables stored on the databases.

19 Claims, 17 Drawing Sheets

(56) References Cited

U.S. PATENT DOCUMENTS

| | | |
|---|---|---|
| 2005/0243604 A1 | 11/2005 | Harken |
| 2006/0235899 A1 | 10/2006 | Tucker |
| 2016/0179850 A1 | 6/2016 | Martin |
| 2018/0107466 A1 | 4/2018 | Rihani |
| 2019/0108223 A1 | 4/2019 | Fabijancic |

OTHER PUBLICATIONS

Lau et al., Migrating e-commerce database applications to an enterprise java environment, Proceedings of the 2001 conference of the Centre for Advanced Studies on Collaborative research, p. 9, Nov. 5, 2001.

Bordbar et al., Integrated model-based software development, data access, and data migration, International Conference on Model Driven Engineering Languages and Systems, pp. 382-396, Oct. 2, 2005.

Kasonde et al., A Seamless Network Database Migration,Tool for Institutions in Zambia, International Journal of Advanced Computer Science and Applications 9, No. 1: 191-199, Jan. 1, 2018.

Ramzan et al., NoSQL based Secure Environments, IEEE Access, May 15, 2019.

Munir et al., Database independent migration of objects into an object-relational database, The 2nd International Workshop on Autonomous Decentralized System, 2002., pp. 132-139, Nov. 7, 2002.

Rahm et al. A survey of approaches to automatic schema matching, VLDB Journal 10, No. 4: 334-350, Dec. 1, 2001.

Bernstein et al., Model management 2.0: manipulating richer mappings. Proceedings of the 2007 ACM SIGMOD International conference of Management of data, pp. 1-12, Jun. 11, 2007.

Cusick et al., Applying Operational Profiles to Demonstrate Production Readiness of an Oracle to SQL Server Database Port using Web Services, Jul. 25, 2011.

Jigyasu et al., SQL to XQuery translation in the aqualogic data services platform, 22nd International Conference on Data Engineering (ICDE'06), pp. 97-97, Apr. 3, 2006.

Islam et al., Data migration: Connecting databases in the cloud, The 3rd International Conference on Communications and Information Technology (ICCIT) 2012.

* cited by examiner

302

```
DATAFIL (003).TXT - Notepad
File Edit Format View Help

JCL USED      --> CKODMGRT
PROC USED     --> KODMMGRT
PROGRAM IS    --> KODMMGRT
COMMIT NBR    --> 03000
ENV CD        --> MGRTPRD

*** CCID              : 000005792
*** CCID OCRNC NR: 00001
*** SQL STMT SUCCESSFUL ***
INSERT INTO CNTL_TBL_1 (D1, D2 ... DM) VALUES (V1, V2, V3 ... VN)

*** CCID              : 000005792
*** CCID OCRNC NR: 00002
*** SQL STMT SUCCESSFUL ***
INSERT INTO CNTL_TBL_1 (D1, D2 ... DN) VALUES (V1A, V2A, V3A ... VMA)
```

FIG. 13

| Selected Activity(s) | | | | | | |
|---|---|---|---|---|---|---|
| ⊕ Add New Activity   ✚ Add Related Activity   ⊖ Delete Activity | | | | | ⌦ Clear Filters | |
| | Release | Type | ID | Occ. | Description | Reference Number 1 | Reference Number 2 | Comments |
| ☐ | 1.20.1 | Project | 1234 | 1 | Prime Rate Change | 123456 | | Prime Rate Change |
| ☑ | 1.20.1 | | 5678 | 1 | Prime Rate Change-T | xxxxxx | | |

FIG. 15

MANAGING RELATIONAL DATABASES

BACKGROUND

Enterprises use workflows for projects that develop new products or make changes to existing products. The workflows can involve multiple stages with each stage operating in a different relational database environment.

As the project progresses along the workflow, data associated with the product development is transferred from environment to environment. At each stage, within the corresponding relational database environment, additional production development actions are taken until, ultimately, the project is completed and the new or changed product is released.

Each environment stores one or more data tables. Typically, each environment is associated with its own metadata. As the product development data is transferred from tables in one environment to tables in another environment, the data's metadata must be updated.

SUMMARY

Embodiments of the disclosure are directed to a relational database management system. The system includes: an electronic device including a input/output device configured to display graphical user interfaces; a first database associated with a first database environment, the first database environment having a set of first database attributes and storing one or more first data tables; at least one processor; and a non-transitory computer-readable medium storing instructions that when executed by the at least one processor cause the at least one processor to: receive, via a first of the graphical user interfaces, a data entry into a control table; update the control table with the data entry to provide an updated control table; subsequent to the update, receive, via a second of the graphical user interfaces, a first migration command to migrate the updated control table to a first database associated with a first database environment, the first database environment having a set of first database attributes; in response to the receive the command, generate a first computer-executable database management script compatible with the set of first database attributes; and execute the first computer-executable database management script to update the one or more first data tables stored on the first database with data corresponding to the data entry.

In another aspect, a computer implemented method for a relational database management system, includes: receiving, via a first graphical user interface, a data entry into a control table; updating the control table with the data entry to provide an updated control table; subsequent to the updating, receiving, via a second graphical user interface, a first migration command to migrate the updated control table to a first database associated with a first database environment, the first database environment having a set of first database attributes; in response to the receiving the first migration command, generating a first computer-executable database management script compatible with the set of first database attributes; and executing the first computer-executable database management script to update one or more first data tables stored on the first database with first data corresponding to the data entry.

The details of one or more techniques are set forth in the accompanying drawings and the description below. Other features, objects, and advantages of these techniques will be apparent from the description, drawings, and claims.

DESCRIPTION OF THE DRAWINGS

FIG. 13 shows a further example GUI that can be generated using the system of FIG. 1.

FIG. 15 shows a further example GUI that can be generated using the system of FIG. 1.

DETAILED DESCRIPTION

Figure 1:
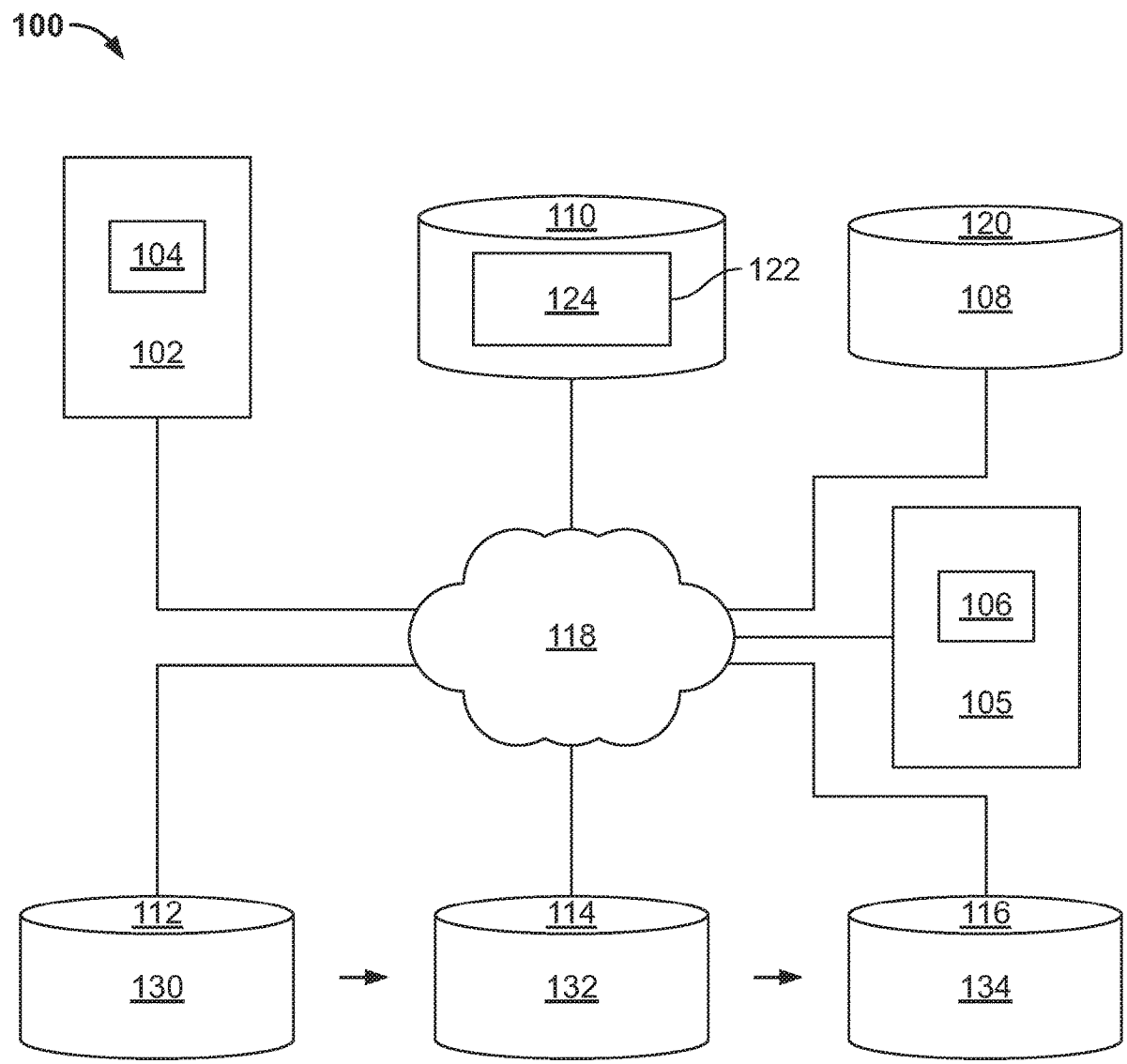
FIG. 1 shows an example system that supports centralized cryptographic management.

The present disclosure is directed to systems and methods for relational database management.

Aspects of the present disclosure relate to improvements in data migration between databases of different relational database environments. For example, a given enterprise decides to a create a new product (e.g., a credit card) or modify an existing product (e.g., change the interest rate or rewards terms of an existing credit card or an investment account) and initiates a project workflow to develop the new product or change the existing product. Alternatively, a project can involve updating one or more attributes of a number of existing products. The workflow can include multiple development stages corresponding to different environments. For example, a workflow for a given project can include an alpha testing (AT) environment stage, an enterprise-internal beta testing (BT) environment stage, a first final testing (FT1) environment stage, a second final testing (FT2) environment stage, a pre-production (PRE-PROD) environment stage, and a production (PROD) environment stage. The final testing environments FT1 and FT2 are user acceptance testing environments that precede production installation. The PRE-PROD environment is a production fix environment that precedes the production phase for the project.

Thus, each environment is generally associated with its own set of product development tasks. In addition, each environment can be associated with an environment-dedicated product development personnel or team of personnel that perform the corresponding product development tasks associated with that environment. The enterprise may grant access permission to a certain individual or certain individuals to perform product development tasks associated with one of the environments while prohibiting or limiting the degree of access of such individual(s) to another one of the environments.

Each environment is associated with its own metadata. Each environment also includes data tables (or, simply, "tables") stored on one or more data storage devices, such as databases. In some examples, each environment includes its own dedicated database or databases. The tables contain data associated with one or more products, and the data are tagged with the corresponding metadata of the environment and table(s) in which the data are stored. Metadata can include, for example, number and types of table rows and data types for the fields in a given table. Example data types can include character only, numerical only, alphanumeric, a number of decimal places, etc.

For a product development project to progress along a workflow, one or more control tables is/are created or modified. When such control table(s) is/are complete, the control table(s) data is/are caused to migrate to a first environment, e.g., an BT environment. Then, once the workflow tasks associated with BT environment are completed, the control table(s) data as modified in the BT environment is/are caused to migrate to a second environment, e.g., FT1 an environment or to another environment. Then, once the workflow tasks associated with the FT1 environment are completed, the control table(s) data as further modified by the FT1 environment, are caused to migrate to a third environment, e.g., the production environment. Then, once the workflow tasks associated with the production environment are completed, the new or changed product is released. Fewer or additional environments may exist along the workflow depending on, e.g., the enterprise and the product(s) being changed or created. Thus, each environment represents a station or phase along a workflow that starts with project inception and ends with project completion and/or product release. The number and types of stations can vary from enterprise to enterprise, as well as from product to product.

Each migration of data from one environment to another environment can be highly time consuming (e.g., on the order of several hours or more), as the data's metadata must be converted or updated to be compatible with that of the destination environment. This can be achieved, for example, by modifying the data to match the destination environment's schema. Environment database schema includes, for example, the structure of the database that defines the objects in the database, including the structure of the data tables of the environment.

Non-limiting examples of relational database schema, as the term "schema" is used herein, include schema that define tables, fields, relationships, views, indexes, packages, procedures, functions, queues, triggers, types, sequences, materialized views, synonyms, database links, directories and other elements.

Updating of table data for schema compatibility upon migration to a destination environment can be performed by manual entry into the tables of the destination environment using the appropriate schema. Manual entry of data by personnel is, however, time consuming and prone to error. In addition, once the data is entered, it may need to be checked by personnel, further increasing the time duration of the migration.

A given migration causes data to migrate to a destination environment. Aspects of the present disclosure relate to reducing migration time of data between environments and improving accuracy of the migrated data by reducing the role of manual (e.g., human) intervention in the migration. According to certain embodiments, migration time is reduced by as much as 80 percent, 90 percent, 95 percent or more. For example, a migration of a given set of data tables from one environment to another environment that would normally take two or more hours to complete manually is reduced, using aspects of the present disclosure, to about five minutes or less.

In accordance with aspects of the present disclosure, executable database management scripts are generated that convert the data to data that is compatible with the destination environment. This can be achieved by, e.g., using the scripts to adapt the schema of the data to be compatible with the destination environment. The executable database management scripts can be generated by software that is activated through particular interactions with graphical user interfaces. The scripts can be written in any suitable programming language, such as a relational database management language. An example relational database management language that can be used for the scripts is Structured Query Language (SQL), which is a standard language of the American National Standards Institute.

Aspects of the present disclosure relate to graphical user interfaces and elements of graphical user interfaces that are operatively linked to executable database management script generators (or, simply, "generators"). Such a generator can be, for example, a sequence of computer-readable instructions stored in non-transitory computer-readable memory that, when executed by one or more computer processors causes the one or more processors to generate the script or script file that adapts the data to the metadata (e.g., the schema) of the destination environment. The one or more processors execute the script or script file, causing the adapted data to be entered in one or more tables stored in the destination environment. A particular user input (e.g., selection via the graphical user interface of a graphical element corresponding to a particular migration action) activates the appropriate generator to generate the script and thereby perform the migration.

Graphical user interfaces of the present disclosure can also provide additional project management functionality, such as managing access permissions to a project in an active workflow, generating and displaying status reports for a project in an active workflow, generating and displaying migration files that show migration actions performed by the relational database scripts and including success or failure indicators of the scripts with respect to updating individual destination environment tables with the new project data, and displaying metadata attributes of tables in different environments.

FIG. 1 schematically illustrates an example system 100 according to the present disclosure. Referring to FIG. 1, the system 100 includes a user electronic device (or "user device") 102, one or more processors 106, and one or more storage devices 108, 110, 112, 114 and 116. The one or more processors 106 can run on a server computer 105 (or "server") managed by, or otherwise associated with, an enterprise (e.g., a financial institution such as a bank, brokerage firm, mortgage company, or any enterprise that relies on relational database environments as part of a product development process) that uses the system 100 for product development workflows.

Optionally, the storage devices (e.g., databases) 108, 110, 112 and 114, as well as the user device 102 can be managed internally by the enterprise and be exclusively associated with the enterprise. Alternatively, one or more of these components (such as the server 105 that includes the processor(s) 106 and/or one or more of the storage devices) can be managed externally of the enterprise, e.g., by a third party, and the enterprise is permitted access to such components of the system 100 to perform product development workflows.

The user device 102, the server 105, and the databases 108, 110, 112 and 114 are interconnected via a network 118. The network can include one or more hard (e.g., wired) connections between the components and/or a wireless such as the Internet, a local area business network, or wide area business network.

In general, the server 105 is operable to receive, via the network 118, information and computer readable instructions from the databases 108, 110, 112, and 114, as well as a from a user of the system via the user device 102.

The user device 102 includes an input/output device 104 configured to display a plurality of graphical user interfaces for performing and managing project workflows in accordance with the present disclosure. The user device 102 can be any of a number of suitable electronic devices, such as a desktop computer, a laptop computer, a tablet device, a smart phone, etc.

The database 108 stores control tables 120. The control tables 120 can be modified manually by a user via the graphical user interface of the input/output device 104 of the user device 102.

The database 110 stores computer-readable instructions 122, including, e.g., executable database management script generators 124 as described above.

The database 112 is associated with, and operates in a BT environment of a product development workflow 126 and stores product development tables having metadata attributes of the BT environment.

The database 114 is associated with, and operates in a FT1 environment of the product development workflow 126 and stores product development tables having metadata attributes (including destination environment schema) of the FT1 environment.

The database 116 is associated with and operates in a production environment of the product development workflow 126 and stores production development tables having metadata attributes of the production environment.

In performing a project (e.g., a product development of a new product or a change to an existing product) with the system 100, the one or more processor(s) 106 execute the instructions 122, causing the processor(s) 106 to receive, via a first graphical user interface displayed on the input/output device 104, one or more data entries. The processor(s) 106 execute the instructions 122 to enter those data entries into one or more of the control tables 120 associated with the project, thereby updating the control tables 120 with the data entries.

Once the control tables 120 are updated, the processor(s) 106 receive, via another graphical user interface displayed on the input/output device 104, a first migration command to migrate the updated control tables to the BT database 112, the database 112 having a set of BT environment metadata attributes. In response to receiving the command, one or more of the database management script generators 124 causes the processor(s) 106 to generate computer-executable database management scripts compatible with the BT environment metadata attributes (including destination table schema) and the processor(s) 106 execute(s) the beta-testing-compatible scripts to update one or more BT data tables 130 stored on the BT database 112 with data corresponding to the data entries.

At some later time after the one or more BT data tables 130 are updated, the processor(s) 106 receive, via another graphical user interface displayed on the input/output device 104, a second migration command to migrate the updated control tables to the FT1 database 114, the FT1 database 114 having a set of FT1 environment metadata attributes (including destination environment schema). In response to receiving the command, one or more of the database management script generators 124 causes the processor(s) 106 to generate computer-executable database management scripts compatible with the FT1 environment metadata attributes (including destination environment schema) and the processor(s) 106 execute the FT1-compatible scripts to update one or more data tables 132 stored on the FT1 database 114 with data corresponding to the data entries.

At some later time after the one or more FT1 data tables 132 are updated, the processor(s) 106 receive, via another graphical user interface displayed on the input/output device 104, a third migration command to migrate the updated control tables to the production database 116, the database 116 having a set of production environment metadata attributes (including environment schema). In response to receiving the command, one or more of the database management script generators 124 causes the processor(s) 106 to generate computer-executable database management scripts compatible with the production environment metadata attributes (including table schema) and the processor(s) 106 execute the production-compatible scripts to update one or more data tables 134 stored on the production database 116 with data corresponding to the data entries.

Once the production environment portion of the workflow 126 is complete, the new product or updated product that has been developed is released. As described above, the workflow can include more or fewer environments than are illustrated in FIG. 1.

It should be appreciated that, within each environment, additional control tables can be modified and then migrated to the next environment along the workflow 126. For example, additional control tables can be modified in the BT phase, and that data can be migrated to the FT1 tables 132 using the appropriate migration scripts and subsequently to the production tables 134 using the appropriate migration scripts. As another example, additional control tables can be modified in the FT1 phase and that data can be migrated to the production tables 134 using the appropriate migration scripts.

Referring now to FIGS. 2-15, a series of graphical user interfaces that can be generated by the processor(s) 106 executing the instructions 122 and displayed on the input/output device 104 of the user device 102 will be described.

Figure 2:
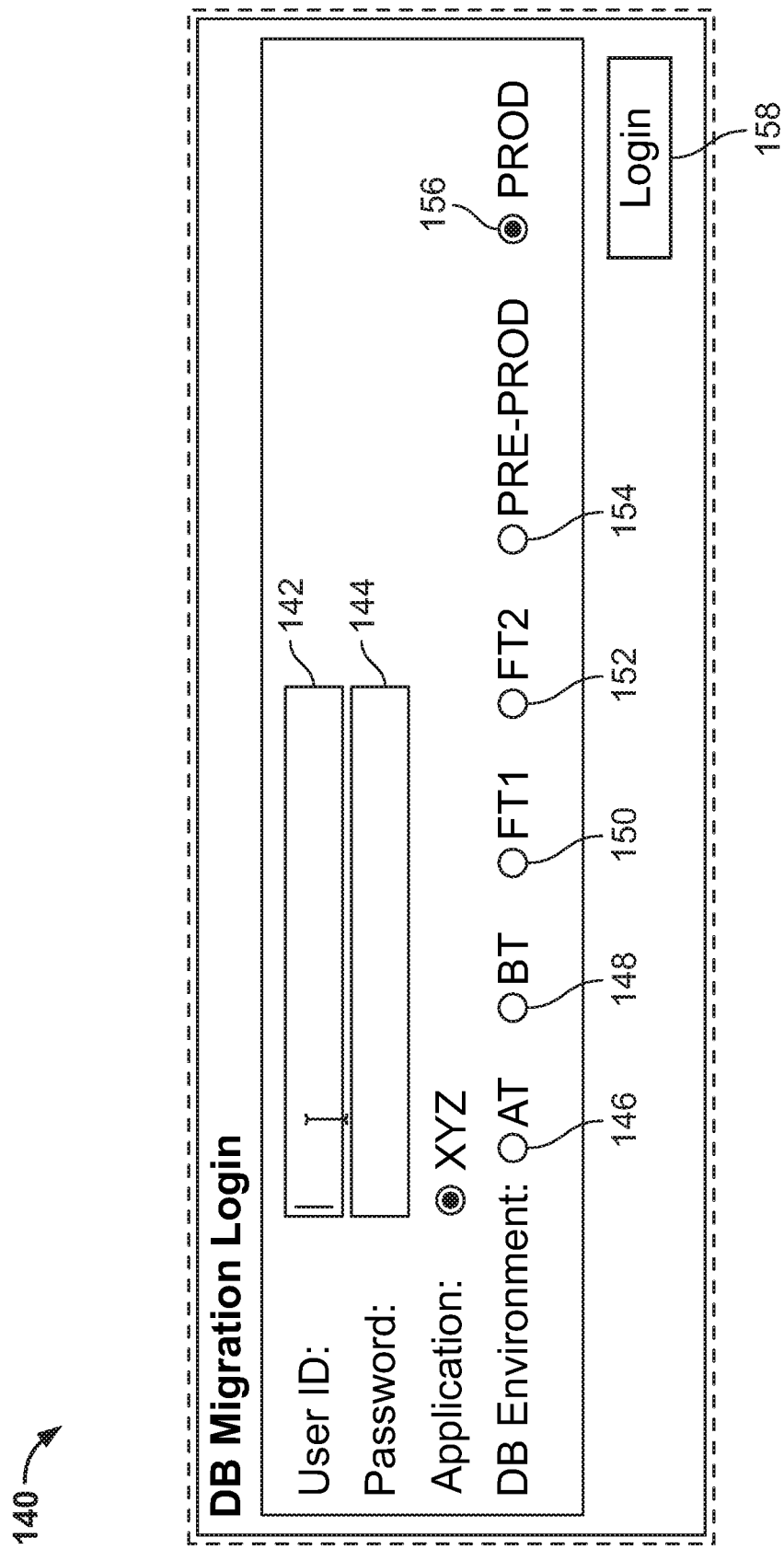
FIG. 2 shows an example graphical user interface (GUI) that can be generated using the system of FIG. 1.

Referring to FIG. 2, a graphical user interface (GUI) 140 is shown. The GUI 140 is a login page for accessing relational database migration tools for a workflow of a product development project of an enterprise according to aspects of the present disclosure. The GUI 140 includes a fields 142 and 144 for entering user ID and password credentials. A series of selectable radio buttons 146, 148, 150, 152, 154 and 156 correspond to each of a plurality of selectable product development environments.

It should be appreciated that a user that has access credentials for one of the product development environments may not have credentials for another of the environments. For example, a product developer may have access to the development environment represented by the radio button 146, but not the product testing environment represented by the radio button 148. Similarly, only a project or product manager or enterprise executive may have access to the production environment 156 represented by the radio button 156. Once a user with proper credentials for the selected environment enters those credentials in the fields 142 and 144 and selects the button 158, a further GUI is displayed in which input can be received via the GUI related to the selected environment.

Figure 3:
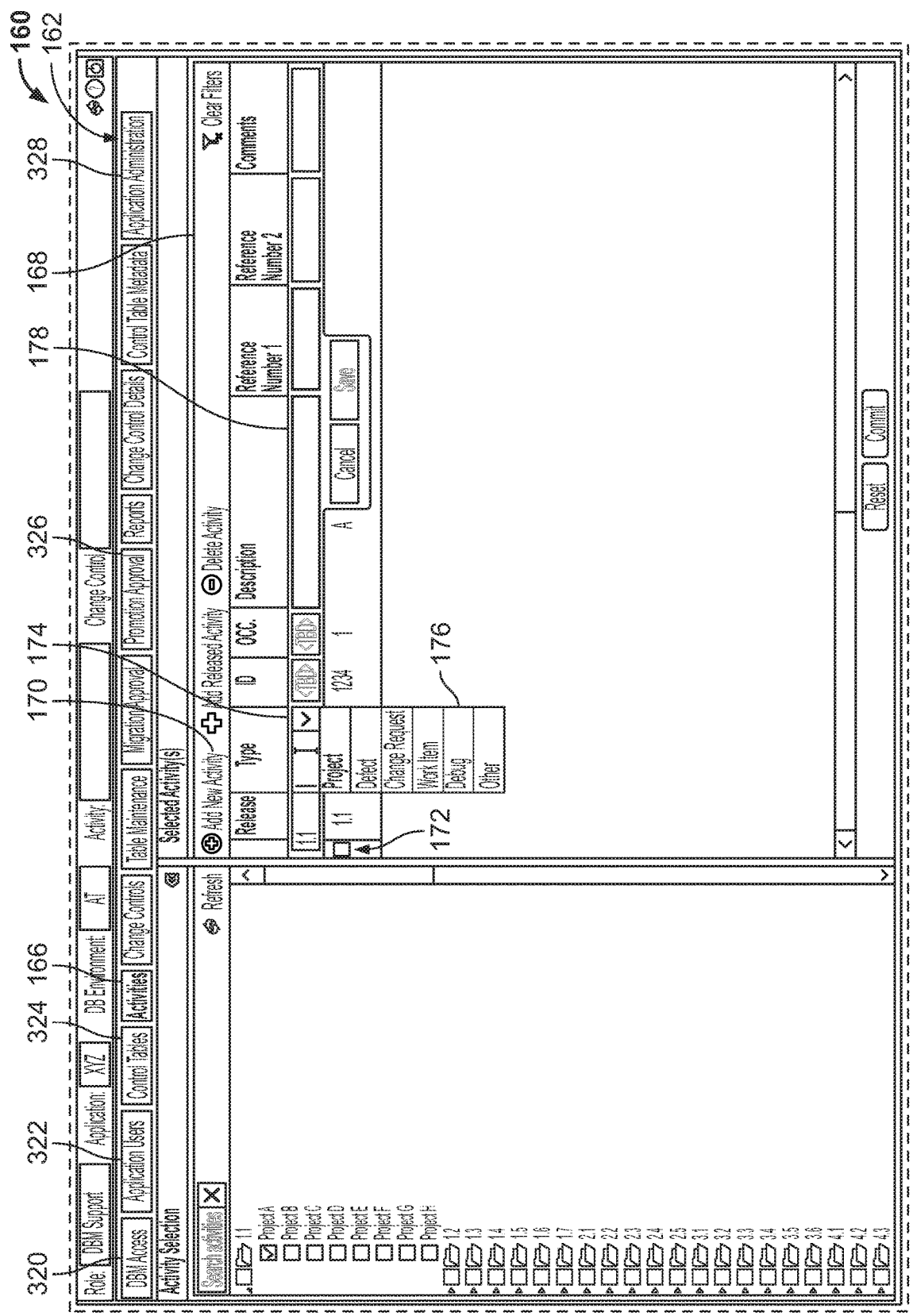
FIG. 3 shows a further example GUI that can be generated using the system of FIG. 1.
Figure 4:
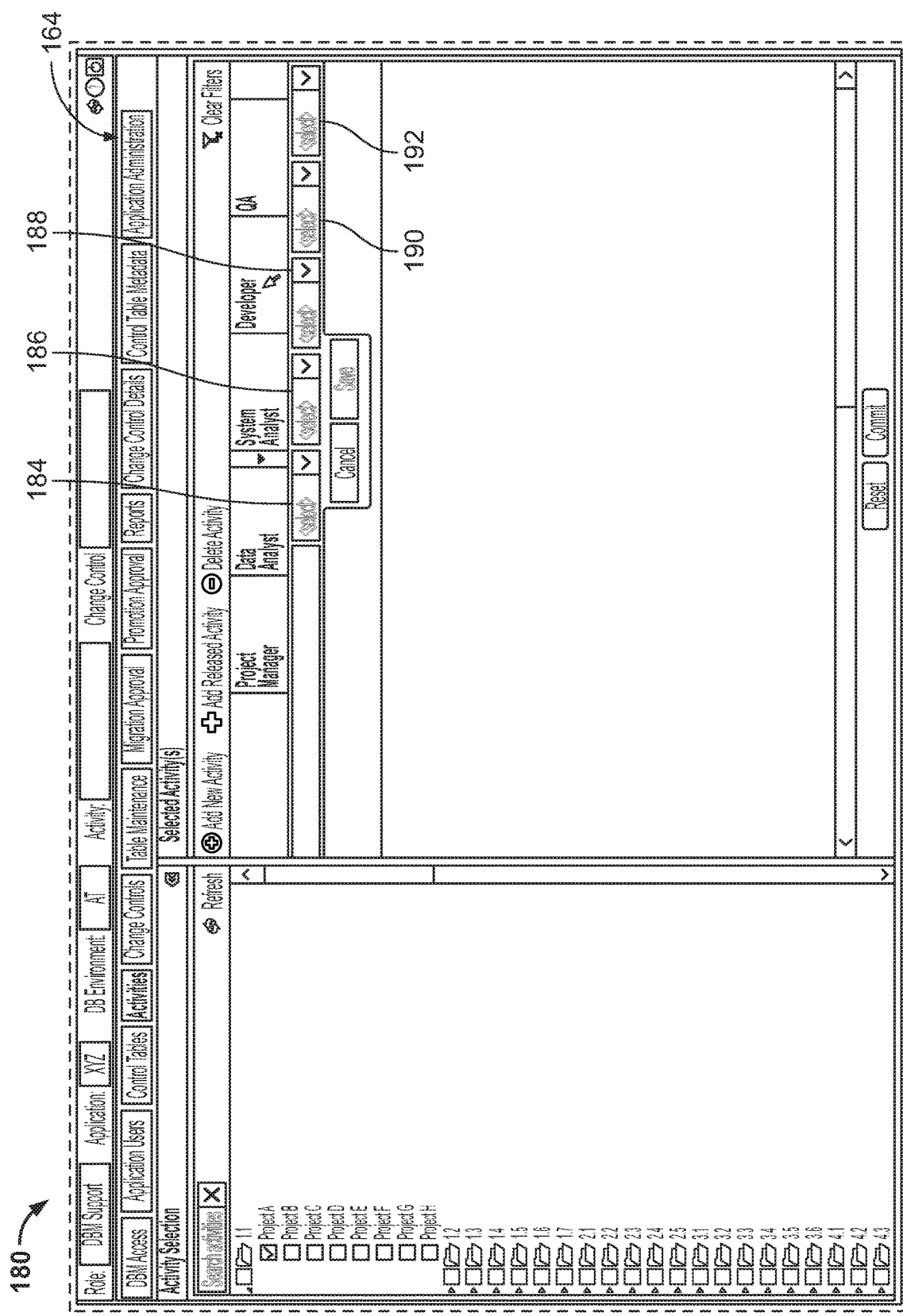
FIG. 4 shows a further example GUI that can be generated using the system of FIG. 1.

Logging in from the GUI 140 generates a project management dashboard. Referring to FIG. 3, a GUI 160 is shown that includes a project management dashboard 162. The GUI 160 is generated after logging in from the GUI 140 of FIG. 2. The particular version of the dashboard that is displayed upon logging in can depend on which of the radio buttons (146, 148, 150, 152, 154, 156) was selected at the GUI 140 (FIG. 2).

The dashboard 162 includes a dashboard migration tabs row 164. The tabs row 164 includes a plurality of selectable navigation tabs that enable viewing of various types of information relating to projects and also enable various actions that can be taken with respect to projects. In the GUI 160, the Activities tab 166 has been selected, causing an activities window 168 to be displayed. The activities window includes an Add New Activity button 170. Selecting the button 170 causes an activity creator 172 to be displayed. The activity creator 172 includes a plurality of fields for entering information relating to an activity. For example, at the type field 174, a drop down menu 176 can be selected. Selecting "Project" from the drop down menu 176 defines the new activity as a new project. The new project can be, e.g., creating a new product or modifying an existing product. Additional information fields, such as a project description field 178 can then be populated to describe and attach various attributes to the new project. For example, referring to FIG. 4, the scroll bar 182 can be used to display additional information fields in the activity creator 172, including a project manager field 184, a data analyst field 186, a system analyst field 188, a developer field 190, and a quality assurance field 192, for assigning roles and access permissions to various personnel for the new project. The dashboard includes a commit button 194. Selection of the commit button 194 creates the project.

Figure 5:
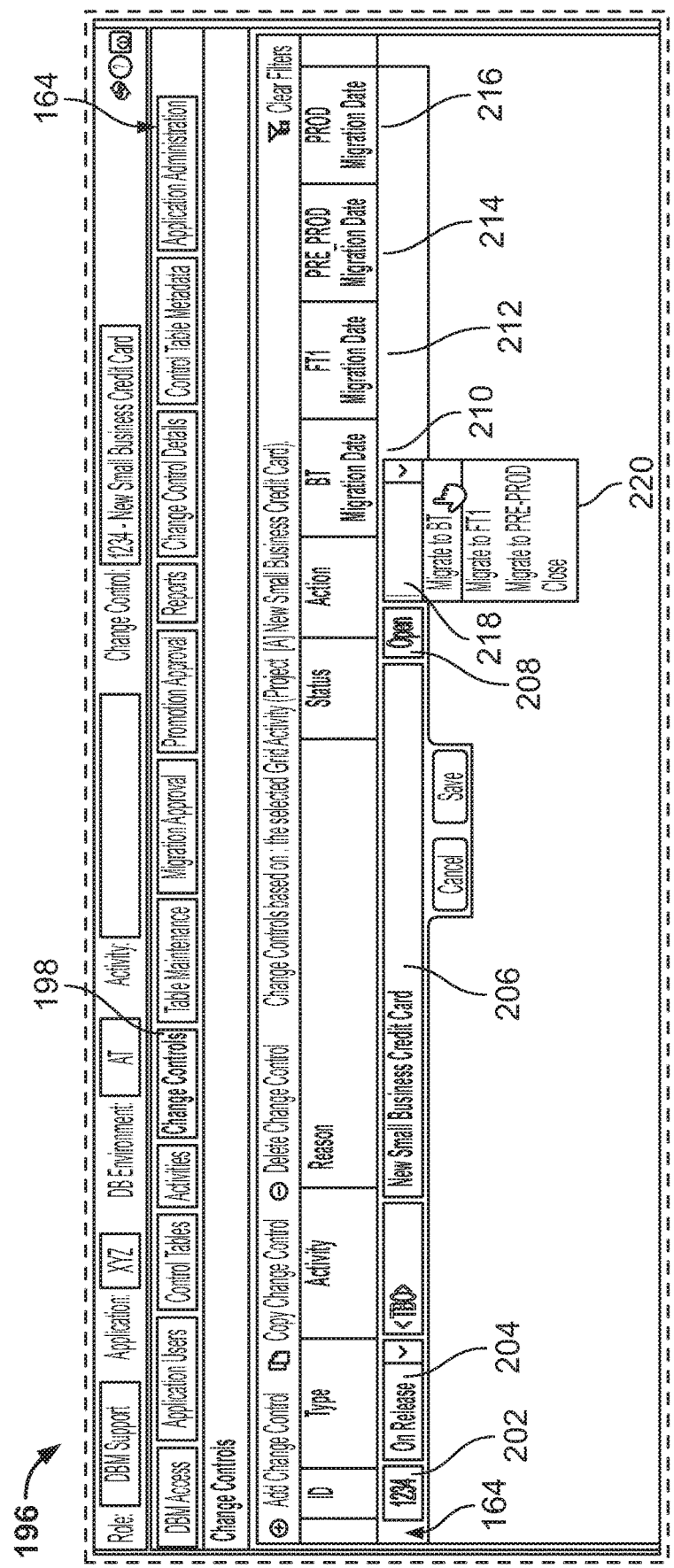
FIG. 5 shows a further example GUI that can be generated using the system of FIG. 1.

Referring to FIG. 5, a portion of a further GUI 196 is shown. The GUI 196 is displayed upon selection of the Change Controls tab 198 in the tabs row 164 of the dashboard. For a selected project the control manager 200 is displayed. The control manager 200 includes a plurality of fields that can be populated to perform various actions associated with the selected project. The selected project is identified in the project ID field 202. The type of project is identified in the project type field 204. Example types of project include an on release project and an off release project. The reason field 206 describes the project or a purpose for the project. The status field 208 includes the status of the project. The environment migration date fields 210, 212, 214 and 216 indicate the date (if any) that the project was migrated to each environment along the workflow.

An action field 218 can be populated with an action to take with respect to the selected project. A drop down menu 220 includes selectable options for actions. The actions include migration actions to the different environments so that a project can be migrated to a selected environment.

Figure 6:
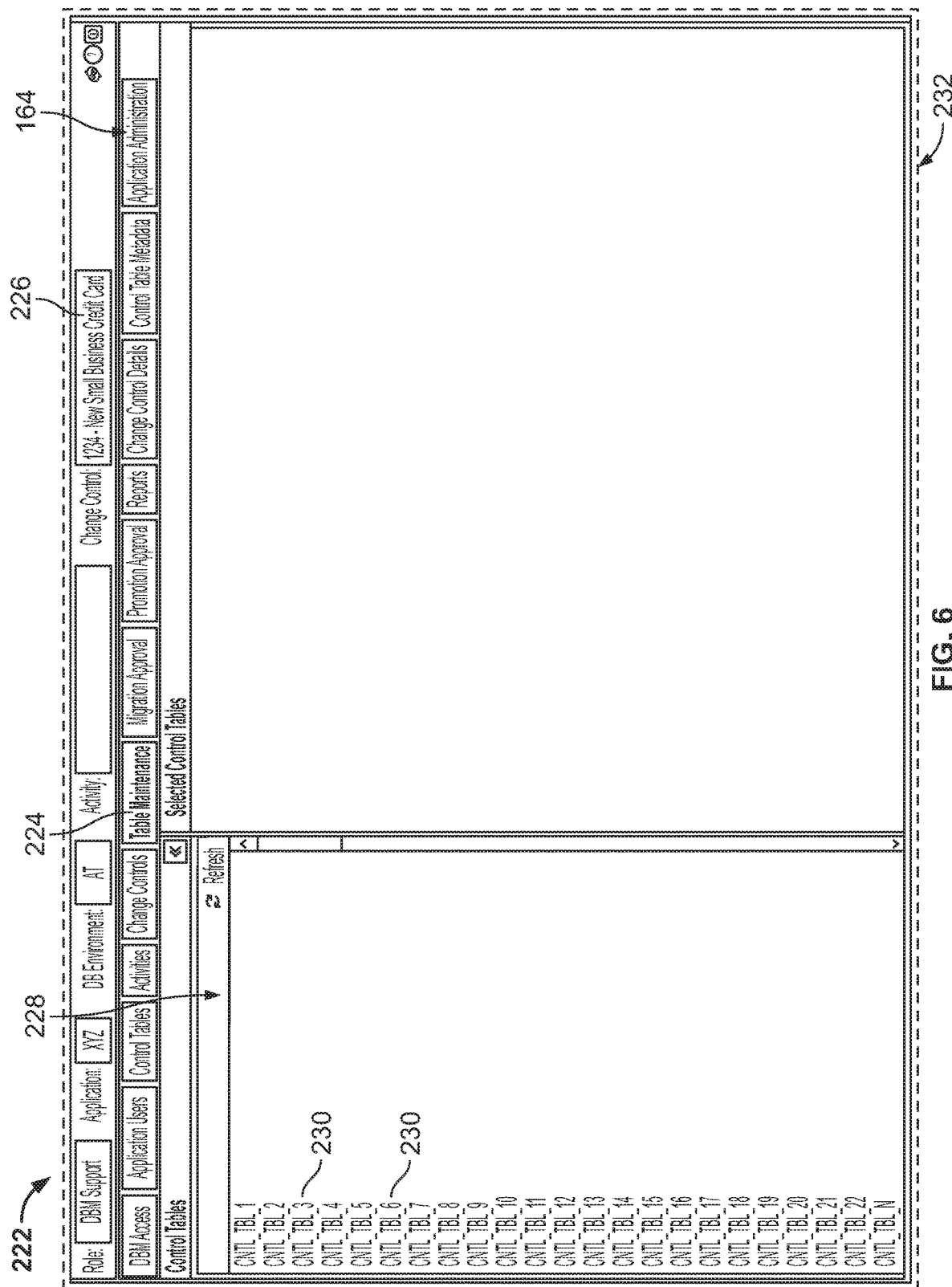
FIG. 6 shows a further example GUI that can be generated using the system of FIG. 1.

Referring to FIG. 6, a further GUI 222 is shown. The GUI 222 is displayed upon selection of the Table Maintenance tab 224 in the tabs row 164 of the dashboard for a selected project identified in the field 226.

The GUI 222 includes a window 228 listing different selectable control tables 230. The control tables 230 can be stored on the database 108 (FIG. 1). Each of the control tables 230 stores data that defines one or more attributes of one or more products of the enterprise. Not every control table may be relevant to a given product or to a given project. For example, if a project involves changing an interest rate on an existing credit card product, it may be necessary only to modify control tables associated interest rate attributes.

Figure 7:
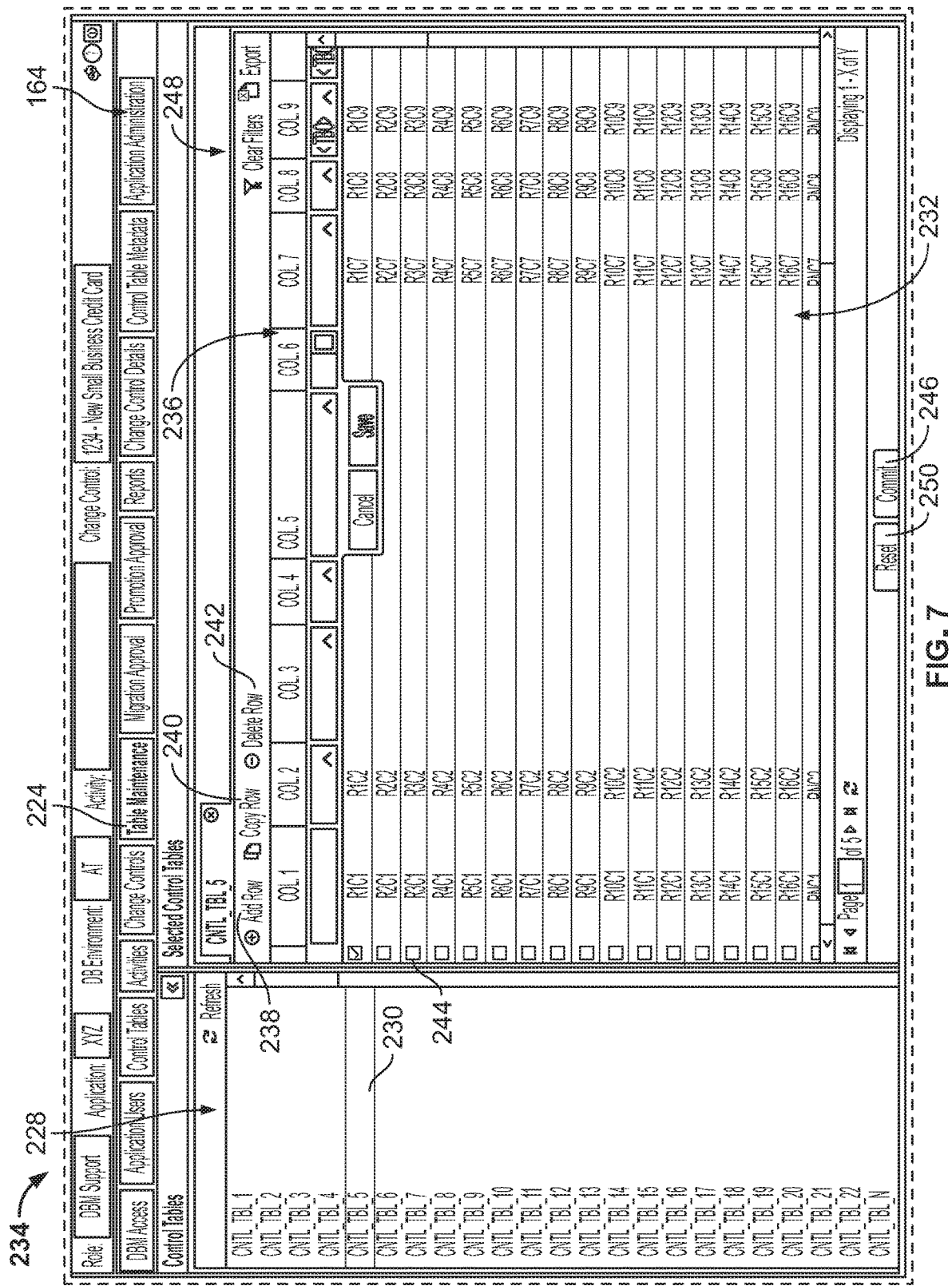
FIG. 7 shows a further example GUI that can be generated using the system of FIG. 1.

Selecting a control table 230 in the window 228 causes the selected control table 230 to populate the control table adjustment window 232, as shown in the GUI 234 of FIG. 7. Referring to FIG. 7, the table 230 named CNTL_TBL_5 has been selected in the window 228 and populates the window 232. The selected table can be modified in the window 232 by, for example, adding a row 236 of data, deleting a row of data, or copying a row of data using the buttons 238, 240 and 242 according to the requirements of the project. Additionally, an existing row of data can be selected by selecting the corresponding radio button 244, and then the data in the selected row can be modified according to the requirements of the project.

Multiple tables 230 from the window 228 can be selected and navigable for modifications using a navigation bar 248 that includes a selectable table for each selected table 230.

Once the control table(s) have been modified, the changes can be saved by selecting the commit button 246. Selection of the reset button 250 removes any modifications that have been made to selected tables in the window 232.

Figure 8:
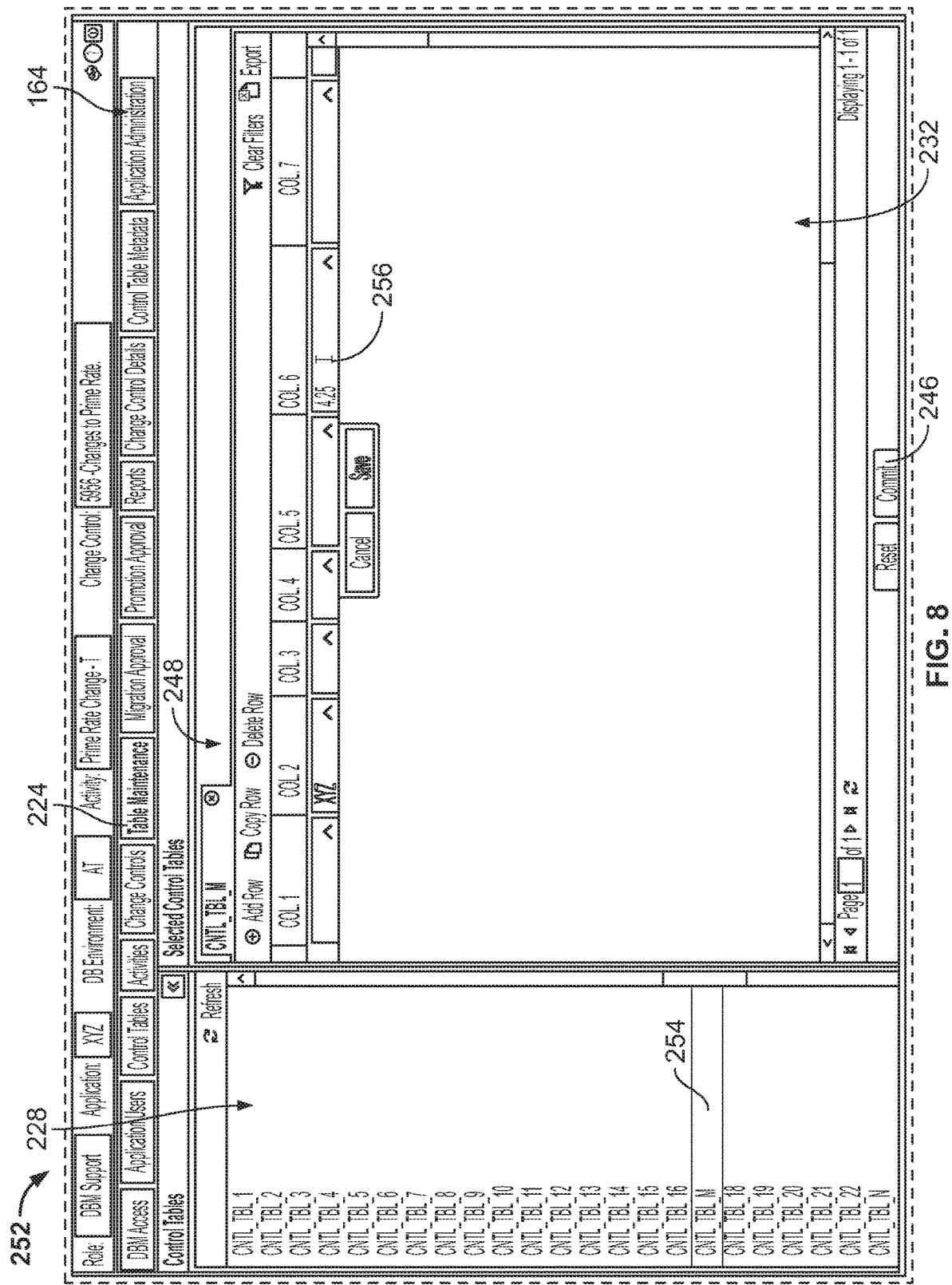
FIG. 8 shows a further example GUI that can be generated using the system of FIG. 1.

Referring to FIG. 8, the GUI 252 shows a stage in a workflow of an example project of modifying a prime interest rate as set by the Federal Reserve Bank. The project was previously created using the Activities tab 166 (FIG. 3). In this hypothetical example, the Federal Reserve Bank has changed the prime rate to 4.25 percent. The enterprise opens a project to modify the prime rate. Completion of the project causes the modification to be applied to products of the enterprise that are impacted by the prime rate change.

Modifying the prime rate requires modifying a single field 256 in the CNTL_TBL_M table, which is the selected table 254 from the window 228 that then populates the window 232 where the table can be edited. Once the selected control table 254 has been edited appropriately by entering 4.25 in the data field 256, the commit button 246 is selected to commit the change to the control table 254.

Figure 9:
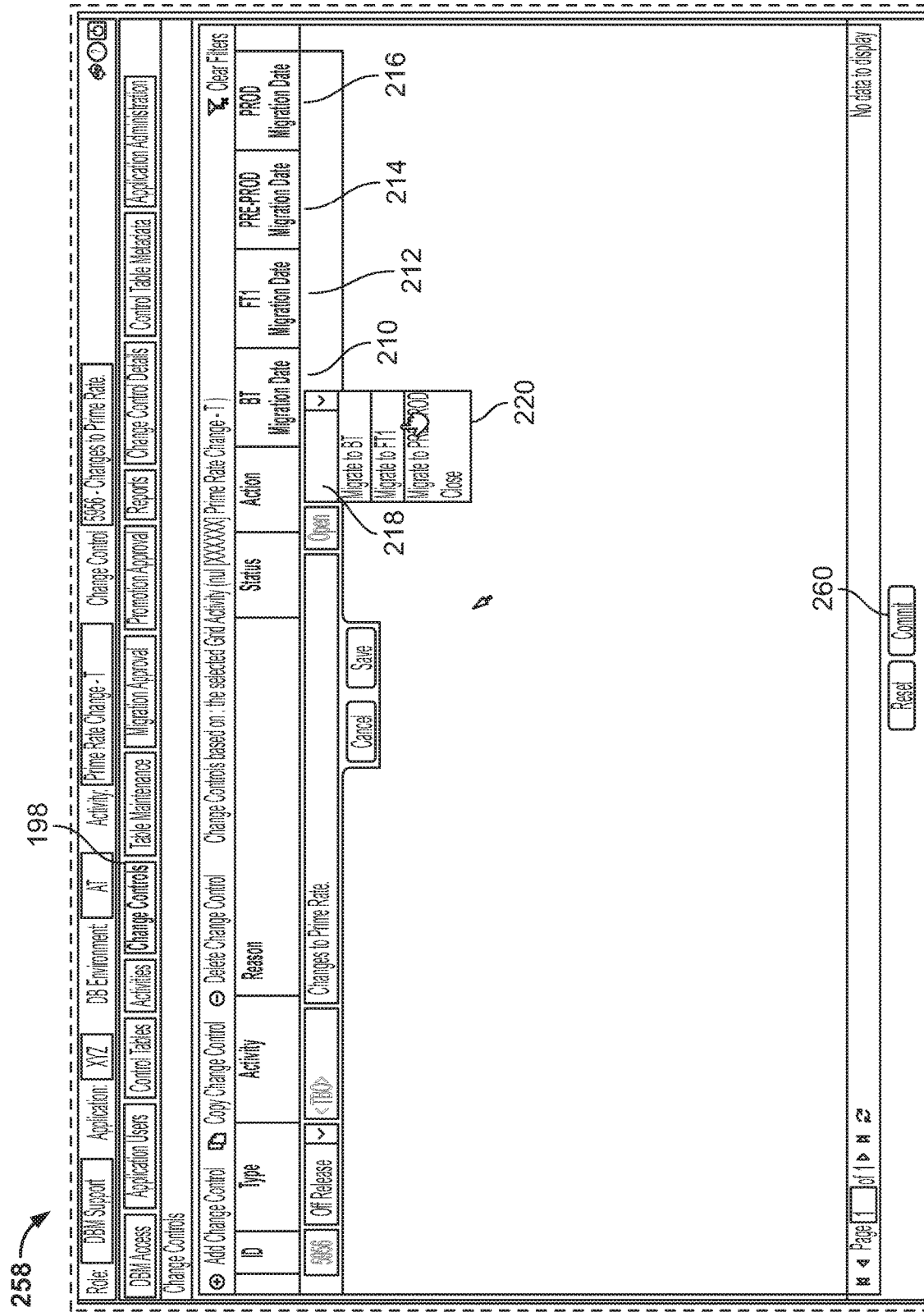
FIG. 9 shows a further example GUI that can be generated using the system of FIG. 1.

Referring to FIG. 9, a further GUI 258 of the dashboard is shown that is displayed for the prime rate change project after the change to the control table 254 (FIG. 8) was committed and the change controls tab 198 is selected. The user can select the drop down menu 220 to select a migration action for all the control tables that have been updated for the prime rate change project (in this example, only the control table 254 (FIG. 8) has been modified for the given project). The first destination environment is typically the BT environment, and so the user would select "Migrate to BT" from the drop down menu 220 and select the commit button 260 to migrate the updated control table to the BT environment. Once the relevant personnel has performed any required review or changes in the BT environment, the same GUI 258 can be used to migrate the updated control table to subsequent environments in the workflow, such as the FT1 environment.

Selecting the commit button 260 once Migrate to BT has been selected from the menu 220 activates one or more of the generators 124 (FIG. 1) to generate computer-executable database management scripts compatible with the BT environment metadata attributes and thereby update one or more BT data tables impacted by the change to the control table 254. In effect, data corresponding to the 4.25 percent change is automatically entered in the impacted BT data table or tables, without direct manual entry of the data, and with the appropriate BT environment schema and other IST-specific attributes.

Similarly, at some later time after the one or more BT data tables are updated and the BT stage of the project is complete, a migration command is received via selection of the commit button 260 to migrate the updated control tables to the FT1 database. In particular, selecting the commit button 260 once Migrate to FT1 has been selected from the menu 220 activates one or more of the generators 124 (FIG. 1) to generate computer-executable database management scripts compatible with the FT1 environment metadata attributes and thereby update one or more FT1 data tables impacted by the change to the control table 254. In effect, data corresponding to the 4.25 percent change is automatically entered in the impacted FT1 data table or tables, without direct manual entry of the data, and with the appropriate FT1 environment schema and other FT1-specific attributes.

This process is repeated for each successive environment migration until the project enters production. With each migration, the corresponding migration date field 210, 212, 214, 216, 218 is updated.

Figure 10:
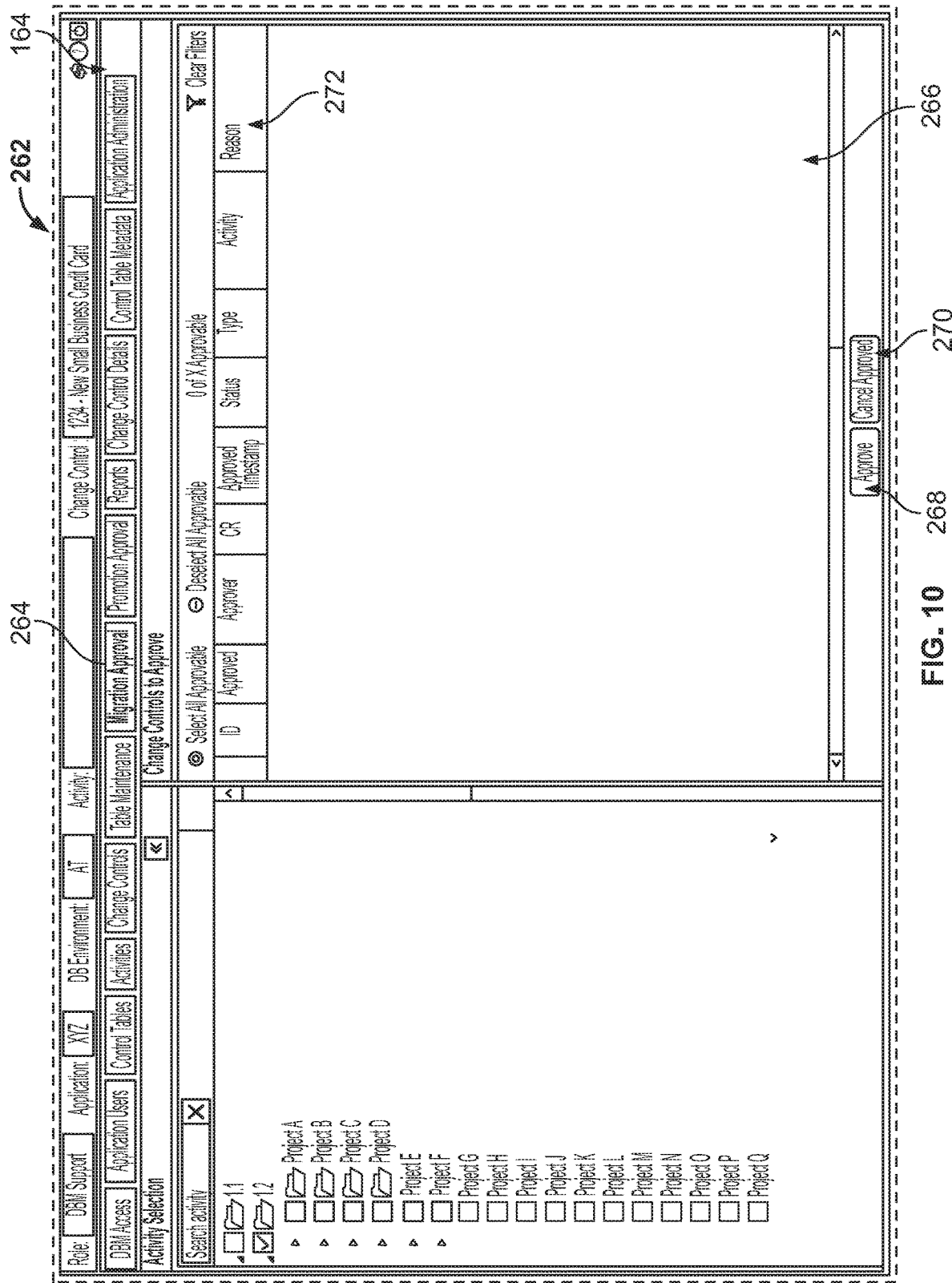
FIG. 10 shows a further example GUI that can be generated using the system of FIG. 1.

Referring to FIG. 10, optionally, prior to a migration, the migration must be approved. For example, once the commit button 260 (FIG. 9) has been selected for a given migration, the migration must be approved under the migration approval tab 264. Selection of the migration approval table 264 generates the GUI 262 which provides, for a selected project, a list of requested migrations from one environment to another. The requested migrations are displayed in the window 266. Buttons 268 and 270 can be selected to either approve or cancel approval of the requested migration(s). In these examples, the relevant computer-executable database management scripts discussed above are not generated until a given migration to a destination environment is approved at the GUI 262 by selection of the Approve button 268. Also displayed in the window 266 is information 272 about an approval including, e.g., the identity of an approver, the status of an approval, a time of an approval, etc.

Each completed migration automatically generates, by processor-executed computer-readable instructions, a migration report including information about the project in question, the tables that have been modified for the project, when they were modified, the nature of the modifications, the reason(s) for the modification, and the individual or individuals responsible for the updates and the project.

Figure 11:
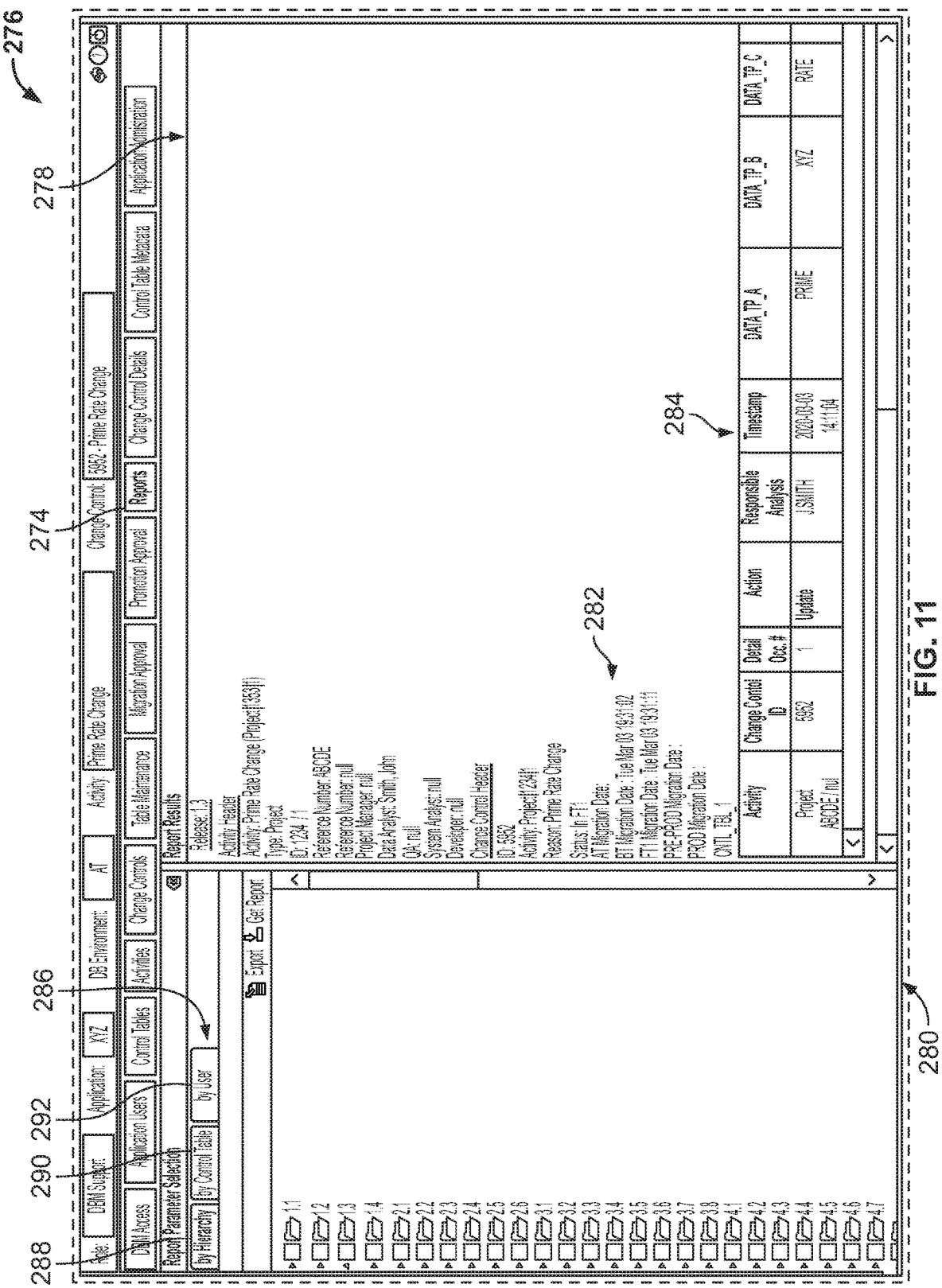
FIG. 11 shows a further example GUI that can be generated using the system of FIG. 1.

Referring to FIG. 11, the reports are available by selecting the Reports tab on the dashboard, which generates the GUI 276. In this example, the prime rate change project has been selected in the project window 280, causing a report of the selected project to be displayed in the report display window 278. As shown, the report includes migration information 282, indicating the project has been migrated to BT and FT1, but not beyond FT1 in the workflow. A table modification area 284 of the report window 278 displays information such as which control tables have been modified for the project, what the modification(s) have been, when the modification(s) was/were committed, and the responsible individual or team.

A series 286 of navigation tabs 288, 290, 292 allow retrieval of a desired report by selecting a particular project from a project hierarchy (using the tab 288), by selecting a particular control table from a list of control tables (using the tab 290), or by selecting a particular user of the system (using the tab 292). Each of these options provides a navigation tree for locating a desired report for a desired project, and can be advantageous depending on the information known to the user who is querying the report.

Figure 12:
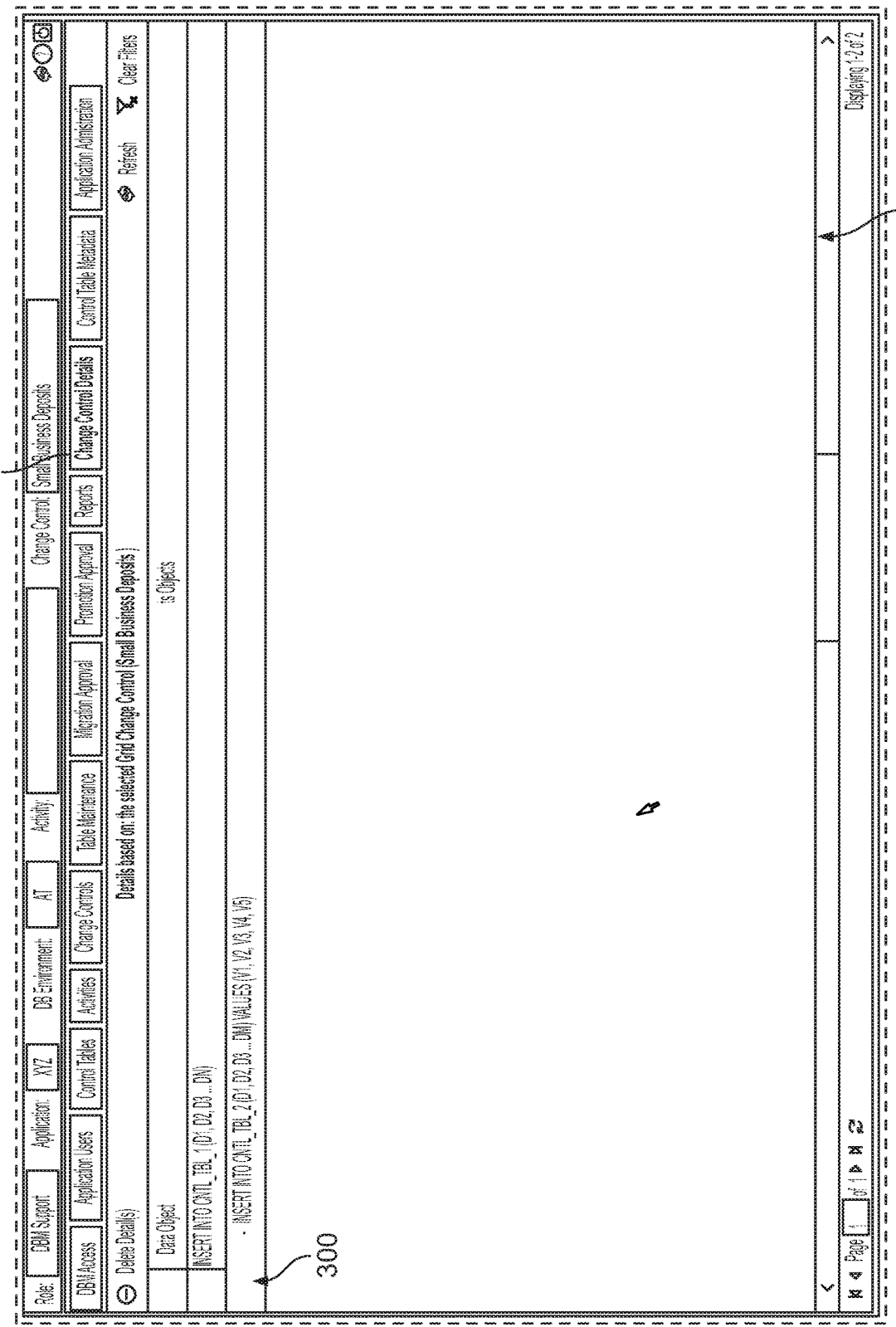
FIG. 12 shows a further example GUI that can be generated using the system of FIG. 1.

Referring to FIG. 12, a GUI 294 is displayed upon selection of the Change Control Details tab 296 of the dashboard. The GUI 294 includes an information window 298 that displays the SQL scripts that were generated to perform the environment migrations for a given project. In addition, upon each migration a data file accessible to a user with appropriate access permissions is automatically generated indicating the success or failure of the execution of each SQL script generated for the migration for updating the tables in the destination environment. An example of such a data file is shown in FIG. 13. The data file 302 is viewable on the input-output device of the user electronic device and includes details about each SQL statement that was generated and whether the execution of each statement occurred successfully or unsuccessfully. These data files offer a quick and efficient troubleshooting resource for a user to identify if any portion of a migration failed, allowing the failure to be corrected and the migration or portion of the migration rerun quickly.

Figure 14:
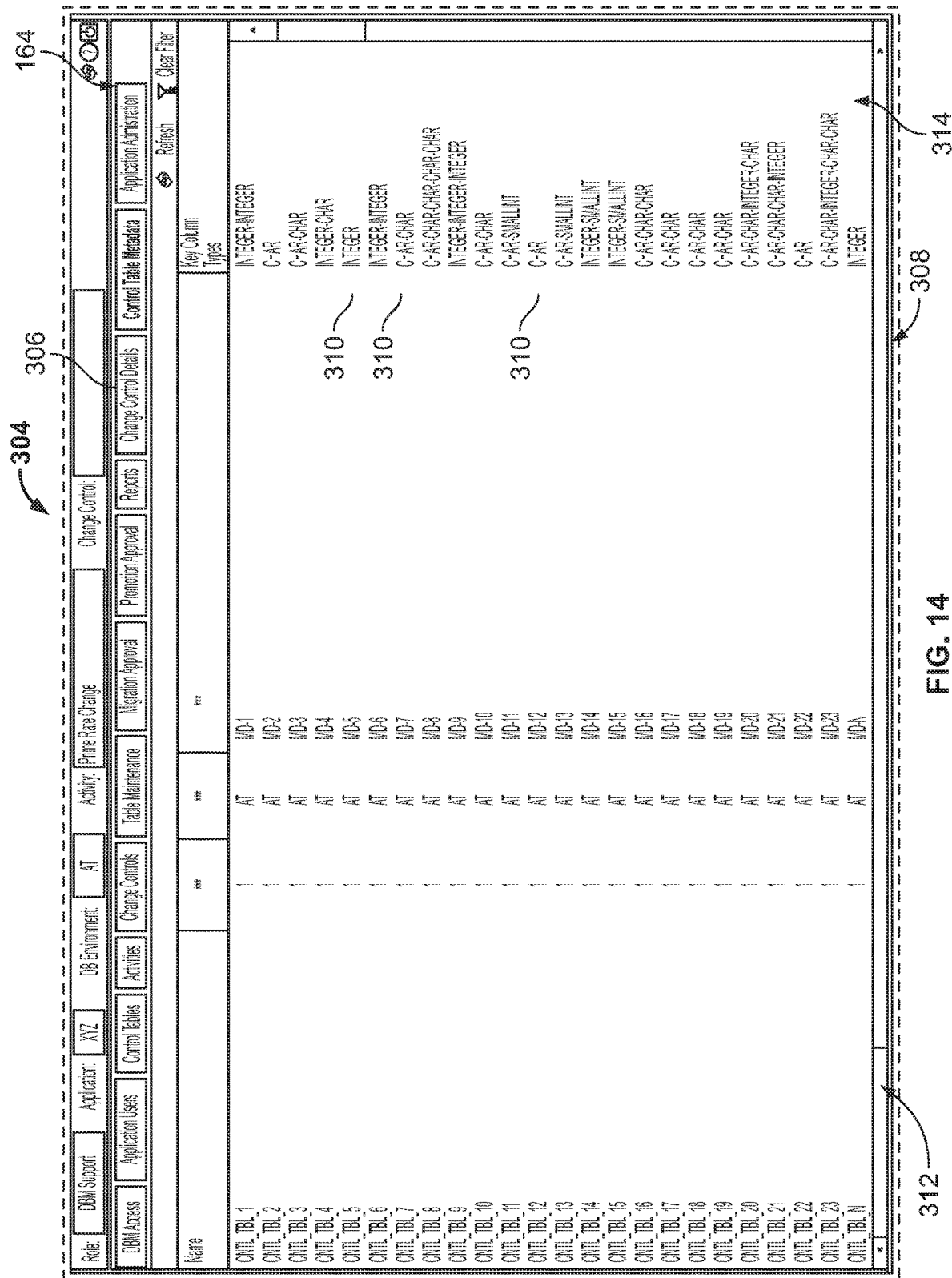
FIG. 14 shows a further example GUI that can be generated using the system of FIG. 1.

Referring to FIG. 14, another interactive feature of the dashboard is illustrated. The GUI 304 is displayed upon selection of the Control Table Metadata tab 306. The GUI 304 includes a window 308 that lists the names of existing control tables in a column 312 and the corresponding metadata attributes 310 of those control tables in a column 314. The information provided by selection of the tab 306 can be used, for example, as a reference for manually updating data fields of a control table when commencing a project. In addition, the SQL generators can use the metadata 310 when generating SQL scripts to update the tables in a given destination environment with data having the appropriate and compatible metadata.

Referring to FIG. 15, another interactive feature of the dashboard is illustrated. A portion of a GUI 316 is illustrated, which can be displayed upon selection of the Activities tab 166 (FIG. 3). A list of projects is displayed. An indicator 320, e.g., a highlighted region, is associated with the listed project 319, indicating initiation of the project 319 has not yet commenced. For example, a user may have to enter additional information about the project in order for the project to commence. In contrast, no such indicator appears in connection with the project 318, indicating that no further action is needed to initiate the project 318.

Referring again to FIG. 3, the dashboard also includes in the dashboard migration tabs row 164, a system access tab 320, an Application Users tab 322, a Control Tables tab 324, a Promotion Approval tab 326, and an Application Administration tab 328.

Selection of the system access tab 320 generates a GUI that displays information and allows management of the underlying project management and migration system that provides the workflow management features and functions provided by the other GUIs described herein.

Selection of the Application Users tab 322 generates a GUI that provides information about the users who have access to and manage projects and can use the underlying system.

Selection of the Control Tables tab 324 generates a GUI that lists and provides other information about control tables underlying the enterprise's products.

Selection of the Promotion Approval tab 326 generates a GUI via which an authorized user can approve additional aspects of a project prior to production and release.

Selection of the Application Administration tab 328 generates a GUI that provides information about users with administrative privileges with respect to the underlying system.

Figure 16:
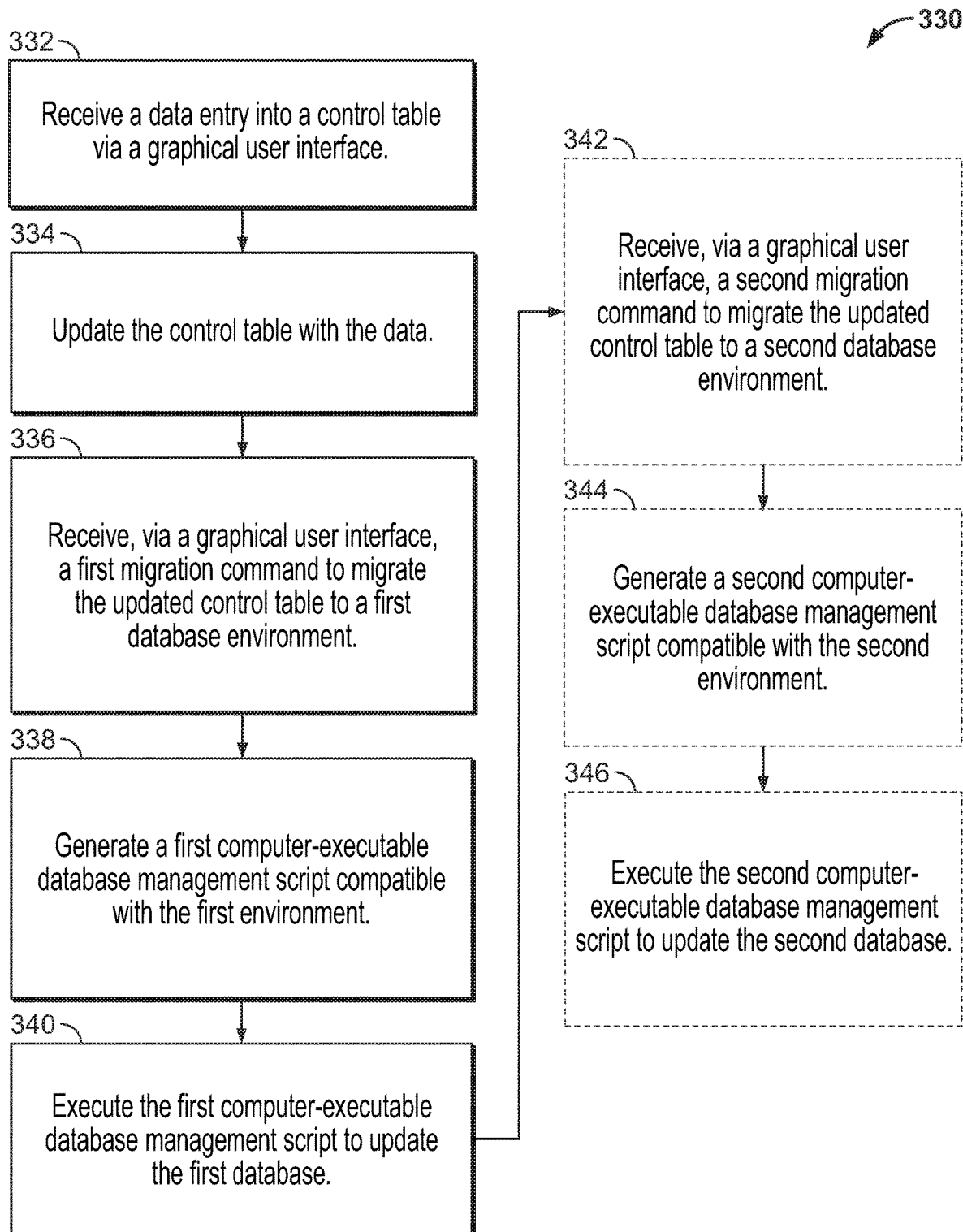
FIG. 16 shows a process flow for an example method according to the present disclosure.

Referring to FIG. 16, an example process flow 330 for the system 100 of FIG. 1 and using the GUIs of, e.g., FIGS. 3-15, is illustrated. For example, the process flow 330 can represent workflow or a portion of a workflow for a project, such as developing a new product or modifying an existing product.

At a step 332 of the process 330, a data entry into a control table is received via a GUI.

At a step 334, the control is updated with the data entry.

At a step 336, a migration command is received via a GUI to migrate the updated control table to a database of a first database environment, having a first set of attributes (e.g., the destination environment schema).

At a step 338, a script is generated in response to the command.

At a step 340, the script is executed causing the corresponding table of the database of the first database environment to be updated and according to the schema and/or other metadata attributes of the first database environment. Optionally, at this point, the project can be completed. For example, a new product or updated product can be released.

Optionally, following the step 340, at a step 342, a further migration command is received via a GUI to migrate the updated control table to a database of a second database environment, having a second set of attributes (e.g., destination environment schema) different from the first set of attributes.

Optionally, at a step 342, a further script is generated in response to the further migration command.

Optionally, at a step 346, the script is executed causing the corresponding table of the database of the second database environment to be updated and according to the schema and/or other attributes of the second database environment. The iterative process of environment migration can be repeated for as many environments along the workflow as needed and, ultimately, the project can be completed.

Figure 17:
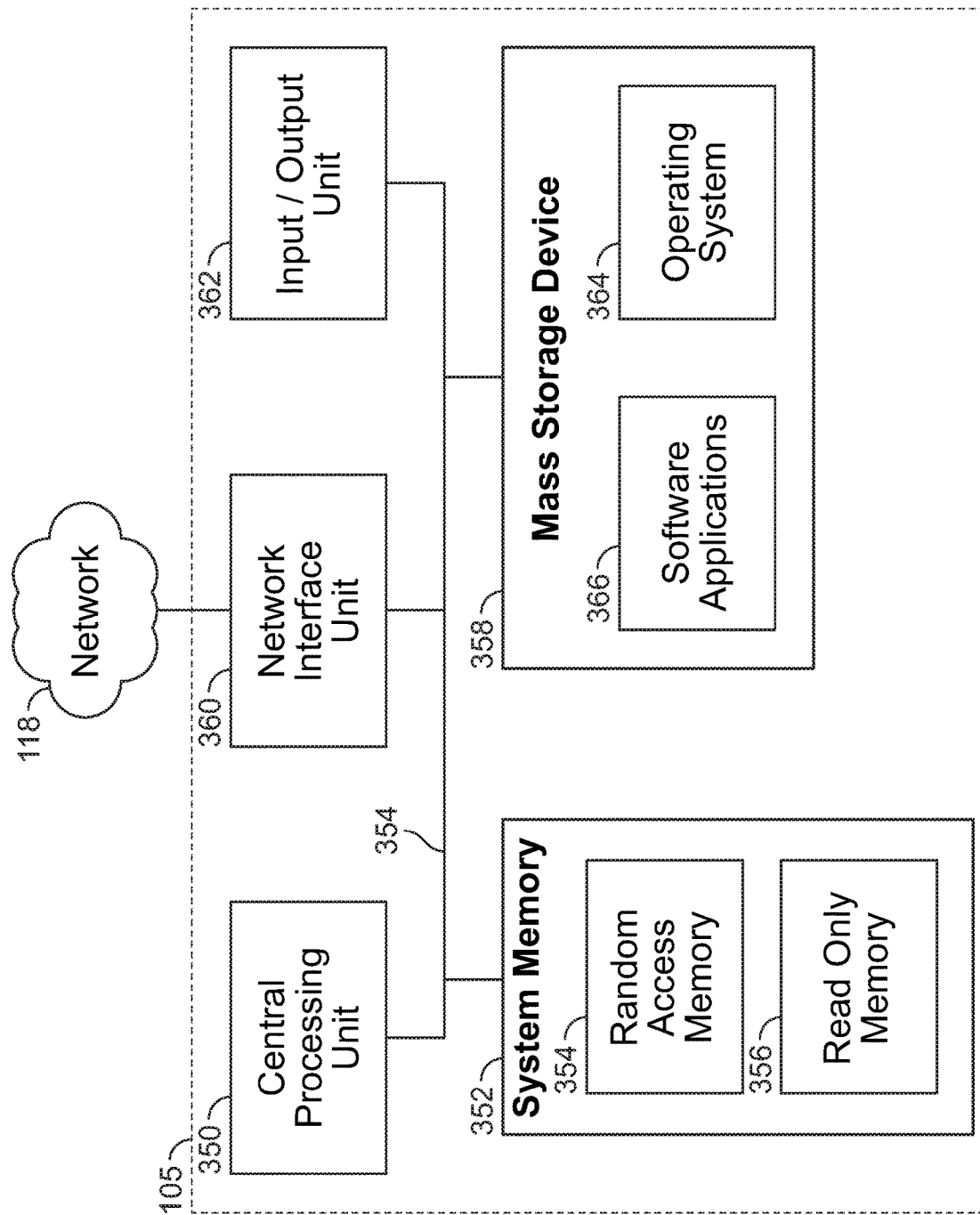
FIG. 17 shows example physical components of portions of the system of FIG. 1.

Referring now to FIG. 17, the server computer 105 of the system 100 of FIG. 1 includes at least one central processing unit ("CPU") 350, which can include the one or more processor(s) 106 (FIG. 1). The server computer 105 also includes a system memory 352, and a system bus 354 that couples the system memory 352 to the CPU 350. The system memory 352 includes a random access memory ("RAM") 354 and a read-only memory ("ROM") 356. A basic input/output system contains the basic routines that help to transfer information between elements within the server computer 105, such as during startup, is stored in the ROM 356. The server computer 105 further includes a mass storage device 358, which can, but need not, correspond to the database 110 and/or the database 108 of FIG. 1. The mass storage device 358 is able to store software instructions and data. A central processing unit, system memory and mass storage device similar to that in FIG. 17 can included in the user device 102 of FIG. 1.

The mass storage device 358 is connected to the CPU 350 through a mass storage controller (not shown) connected to the system bus 354. The mass storage device 358 and its associated computer-readable data storage media provide non-volatile, non-transitory storage for the server computer 105. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 105.

According to various embodiments of the invention, the server computer 105 may operate in a networked environment using logical connections to remote network devices through the network 118, such as a wireless network, the Internet, or another type of network. The server computer 105 may connect to the network 118 through a network interface unit 360 connected to the system bus 354. It should be appreciated that the network interface unit 360 may also be utilized to connect to other types of networks and remote computing systems. The server computer 105 also includes an input/output controller 362 for receiving and processing input from a number of other devices, such as the user device 102, and the databases 108, 112, 114, and 116 (FIG. 1), including a touch user interface display screen, such as the device 104 of the user device 102 (FIG. 1) or another type of input device. Similarly, the input/output controller 362 may provide output to a touch user interface display screen or other type of output device.

As mentioned briefly above, the mass storage device 368 and the RAM 352 of the server computer 105 can store software instructions and data. The software instructions include an operating system 364 suitable for controlling the operation of the server computer 105. The mass storage device 358 and/or the RAM 352 also store software instructions and applications 366, such as the instructions 122 including the generators 124 (FIG. 1) that when executed by the CPU 350, cause the server computer 105 to provide the functionality of the systems and methods and discussed in this document. For example, the mass storage device 358 and/or the RAM 352 can store software instructions that, when executed by the CPU 350, cause the server computer 105 to display at the device 104 (FIG. 1) the various GUIs described in this document and to receive the various inputs and commands via the GUIs as described in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer implemented method for a relational database management system, comprising:
   receiving, via a first graphical user interface, a data entry into a control table;
   updating the control table with the data entry to provide an updated control table;
   subsequent to the updating, receiving, via a second graphical user interface, a first migration command to migrate the updated control table to a first database associated with a first database environment, the first database environment having a set of first database attributes;
   in response to the receiving the first migration command, generating a first computer-executable database management script compatible with the set of first database attributes; and
   executing the first computer-executable database management script to update one or more first data tables stored on the first database with first data corresponding to the data entry, including modifying the data entry to adapt the data entry to the first database attributes.

2. The computer-implemented method of claim 1, comprising:
   subsequent to the updating, receiving, via a third graphical user interface, a second migration command to migrate the updated control table to a second database associated with a second database environment, the second database environment having a set of second database attributes;
   in response to the receiving the second migration command, generating a second computer-executable database management script compatible with the set of second database attributes; and
   executing the second computer-executable database management script to update one or more second data tables stored on the second database with second data corresponding to the data entry.

3. The computer-implemented method of claim 2, wherein the first set of database attributes includes first database metadata and the second set of database attributes include second database metadata that is different from the first database metadata.

4. The computer-implemented method of claim 3, wherein the first metadata and the second metadata include one or more table field types, the one or more table field types include one or more of a character type, a numeric type, and a number of decimal places type.

5. The computer-implemented method of claim 2, wherein the executing the first and second computer-executable database management scripts cause the first data and the second data to have different database schema from each other.

6. The computer-implemented of claim 2, wherein the first migration command is received via selection of a first database environment migration interactive element displayed by the second graphical user interface and corresponding to the first database environment, and wherein the second migration command is received via selection of a second database environment migration interactive element displayed by the third graphical user interface and corresponding to the second database environment.

7. The computer-implemented method of claim 1, wherein the data entry causes the control table to be updated with a new data field.

8. The computer-implemented method of claim 1, wherein the data entry causes the control table to be updated with a modification of an existing data field of the control table.

9. The computer-implemented method of claim 1, wherein the executing the first computer-executable database management script generates a file including an indicator that the update failed or succeeded with respect to each of a plurality of data fields of the one or more first data tables.

10. The computer-implemented method of claim 1, wherein the executing the first computer-executable database management script generates a report including information about a project associated with the data entry, the information including an identity of a manager of the project, a type of the project, a status of the project, and an indication as to which of a plurality of database environments including the first database environment have been updated with data corresponding to the data entry.

11. The computer-implemented method of claim 1, wherein the first computer-executable database management script is in Structured Query Language (SQL).

12. A relational database management system, comprising:
   an electronic device including an input/output device configured to display graphical user interfaces;
   a first database associated with a first database environment, the first database environment having a set of first database attributes and storing one or more first data tables;
   at least one processor; and
   a non-transitory computer-readable medium storing instructions that when executed by the at least one processor cause the at least one processor to:
      receive, via a first of the graphical user interface, a data entry into a control table;
      update the control table with the data entry to provide an updated control table;
      subsequent to the update, receive, via a second of the graphical user interfaces, a first migration command to migrate the updated control table to a first database associated with a first database environment, the first database environment having a set of first database attributes;
      in response to the receive the command, generate a first computer-executable database management script compatible with the set of first database attributes; and
      execute the first computer-executable database management script to update the one or more first data tables stored on the first database with data corresponding to the data entry,
      wherein the execute the first computer-executable database management script generates a file including an indicator that the update failed or succeeded with respect to each of a plurality of data fields of the one or more first data tables.

13. The relational database management system of claim 12, wherein the instructions when executed by the at least one processor cause the at least one processor to:
   subsequent to the update, receive, via a third graphical user interface, a second migration command to migrate the updated control table to a second database associated with a second database environment, the second database environment having a set of second database attributes;

in response to the receive the second migration command, generate a second computer-executable database management script compatible with the set of second database attributes; and execute the second computer-executable database management script to update one or more second data tables stored on the second database with second data corresponding to the data entry.

14. The relational database management system of claim 13, wherein the first set of database attributes includes first data schema and the second set of database attributes include second data schema that are different from the first data schema.

15. The relational database management system of claim 13, wherein the first migration command is received via selection of a first database environment migration interactive element displayed by the second graphical user interface and corresponding to the first database environment, and wherein the second migration command is received via selection of a second database environment migration interactive element displayed by the third graphical user interface and corresponding to the second database environment.

16. The relational database management system of claim 12, wherein the data entry causes the control table to be updated with a new data field.

17. The relational database management system of claim 12, wherein the execute the first computer-executable database management script generates a report including information about a project associated with the data entry, the information including an identity of a manager of the project, a type of the project, a status of the project, and an indication as to which of a plurality of database environments including the first database environment have been updated with data corresponding to the data entry.

18. The relational database management system of claim 12, wherein the first computer-executable database management script is in SQL.

19. A computer implemented method for a relational database management system, comprising:

receiving, via a first graphical user interface, a data entry into a control table;

updating the control table with the data entry to provide an updated control table;

subsequent to the updating, receiving, via a second graphical user interface, a first migration command to migrate the updated control table to a first database associated with a first database environment, the first database environment being associated with first data schema;

in response to the receiving the first migration command, generating a first SQL script compatible with the set of first data schema;

executing the first SQL script to update one or more first data tables stored on the first database with first data corresponding to the data entry, including modifying the data entry to adapt the data entry to the first data schema;

subsequent to the updating, receiving, via a third graphical user interface, a second migration command to migrate the updated control table to a second database associated with a second database environment, the second database environment having a set of second data schema;

in response to the receiving the second migration command, generating a second SQL script compatible with the second data schema; and executing the second SQL script to update one or more second data tables stored on the second database with second data corresponding to the data entry.

* * * * *

UNITED STATES PATENT AND TRADEMARK OFFICE
CERTIFICATE OF CORRECTION

| | | |
|---|---|---|
| PATENT NO. | : 11,734,236 B1 | Page 1 of 1 |
| APPLICATION NO. | : 16/901533 | |
| DATED | : August 22, 2023 | |
| INVENTOR(S) | : Erickson et al. | |

It is certified that error appears in the above-identified patent and that said Letters Patent is hereby corrected as shown below:

In the Claims

Column 13, Line 6, Claim 1: delete "computer implemented" and insert --computer-implemented--

Column 13, Line 59, Claim 6: delete "computer-implemented of" and insert --computer-implemented method of--

Column 16, Line 4, Claim 19: delete "computer implemented" and insert --computer-implemented--

Signed and Sealed this
Seventeenth Day of October, 2023

Katherine Kelly Vidal
*Director of the United States Patent and Trademark Office*